(12) United States Patent
Li et al.

(10) Patent No.: US 11,972,214 B2
(45) Date of Patent: Apr. 30, 2024

(54) METHOD AND APPARATUS OF NER-ORIENTED CHINESE CLINICAL TEXT DATA AUGMENTATION

(71) Applicant: ZHEJIANG LAB, Zhejiang (CN)

(72) Inventors: Jingsong Li, Hangzhou (CN); Lixin Shi, Hangzhou (CN); Ran Xin, Hangzhou (CN); Zongfeng Yang, Hangzhou (CN); Yu Tian, Hangzhou (CN); Tianshu Zhou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/348,317

(22) Filed: Jul. 6, 2023

(65) Prior Publication Data
US 2024/0013000 A1  Jan. 11, 2024

(30) Foreign Application Priority Data
Jul. 7, 2022  (CN) .......................... 202210793967.4

(51) Int. Cl.
*G06F 17/00* (2019.01)
*G06F 40/169* (2020.01)
(Continued)

(52) U.S. Cl.
CPC .......... *G06F 40/295* (2020.01); *G06F 40/169* (2020.01); *G06F 40/284* (2020.01); *G06F 40/30* (2020.01); *G06F 40/40* (2020.01)

(58) Field of Classification Search
None
See application file for complete search history.

(56) References Cited

U.S. PATENT DOCUMENTS 8,594,996 B2 * 11/2013 Liang ................... G06F 40/247
704/10
9,613,004 B2 * 4/2017 Liang ..................... G06F 40/10
(Continued)

FOREIGN PATENT DOCUMENTS

| CN | 111444721 A | 7/2020 |
| CN | 112733533 A | 4/2021 |

(Continued)

OTHER PUBLICATIONS

First Office Action(CN202210793967.4); dated Aug. 23, 2022.
(Continued)

*Primary Examiner* — Satwant K Singh
(74) *Attorney, Agent, or Firm* — W&G Law Group

(57) ABSTRACT

Disclosed is a method and an apparatus NER-orientated Chinese clinical text data augmentation, and unannotated data and annotated data of label linearization processing through data preprocessing. A concealed part is predicted based on retained information by using the unannotated data and concealing part of information in text, and meanwhile an entity word-level discrimination task is introduced for pre-training of a span-based language model; and a plurality of decoding mechanisms are introduced in a fine-tune stage, a relationship between a text vector and text data is obtained based on the pre-trained span-based language model, linearized data with entity labels is converted into the text vector, and text generation is performed through forward decoding and reverse decoding in a prediction stage of a text generation model to obtain enhanced data with annotation information.

6 Claims, 4 Drawing Sheets

Disease

Obtaining tagged data: the patient took medicine for chronic kidney disease

Entity segmentation: the patient took medicine for chronic kidney disease

Tagging the entity span: the patient took medicine for chronic /B-DIS kidney disease/E-DIS Label linearization: the patient took medicine for B-DIS chronic E-DIS kidney disease

(51) Int. Cl.
 *G06F 40/284* (2020.01)
 *G06F 40/295* (2020.01)
 *G06F 40/30* (2020.01)
 *G06F 40/40* (2020.01)

(56) References Cited

U.S. PATENT DOCUMENTS

| 10,282,389 | B2* | 5/2019 | Liang | G06F 40/295 |
| 11,238,240 | B2* | 2/2022 | Hunter | G06F 40/30 |
| 2019/0236139 | A1* | 8/2019 | DeFelice | G06N 7/01 |
| 2019/0236148 | A1* | 8/2019 | DeFelice | G06N 3/047 |
| 2022/0100966 | A1* | 3/2022 | Hunter | G06F 40/284 |
| 2022/0147715 | A1* | 5/2022 | Wang | G06N 3/045 |
| 2022/0180202 | A1* | 6/2022 | Yin | G06F 16/35 |

FOREIGN PATENT DOCUMENTS

| CN | 112989834 A | 6/2021 |
| CN | 113408288 A | 9/2021 |
| CN | 113761893 A | 12/2021 |
| CN | 113822026 A | 12/2021 |
| CN | 113836930 A | 12/2021 |
| CN | 114564959 A | 5/2022 |
| WO | 2009017464 A1 | 2/2009 |

OTHER PUBLICATIONS

Notice of Allowance(CN202210793967.4); dated Sep. 9, 2022.
Domain-Entity-Recognition-Based-on-Pre-trained-BERT-Character-Embedding.
Multi-channel-self-attention-mechanism-for-relation-extraction-in-clinical-records.
Survey-of-Machine-Reading-Comprehension-Based-on-Neural-Network.
Research-on-Named-Entity-Recognition-from-Sparsely-Labeled-Data.

* cited by examiner

METHOD AND APPARATUS OF NER-ORIENTED CHINESE CLINICAL TEXT DATA AUGMENTATION

CROSS-REFERENCE TO RELATED APPLICATIONS

The present application claims priority to Chinese Patent Application No. 202210793967.4, filed on Jul. 7, 2022, the content of which is incorporated herein by reference in its entirety.

TECHNICAL FIELD

The present disclosure relates to the field of text data augmentation, in particular to a method and an apparatus of NER-oriented Chinese clinical text data augmentation.

BACKGROUND

A named entity recognition task is a basic task in the field of natural language processing, and it is a kind of sequence labeling problem. Similar to the classification task, each unit in a text sequence (the named entity recognition task in Chinese is usually processed based on single words or sub-words) is classified, and the judgment results usually include various categories such as "non-entity", "entity beginning word", "entity middle word" and "entity ending word", among which, the types related to entities will be different according to the types of entities to be predicted.

With the advancement of medical information construction, the amount of medical text data is increasing explosively, and the extraction and utilization of information in unstructured medical documents has become a research hotspot, and the identification of medical named entities is a very basic and important task. By identifying medical named entities, information extraction from unstructured medical texts can be realized, and a large number of medical information contained in the text content can be mined for clinical and scientific research.

At present, the common methods of named entity identification are mainly based on statistical learning or deep learning, and supervised learning is used to learn and train the model. These methods are usually used to identify medical entities. The supervised learning method usually has high accuracy, but it requires enough samples. The more samples, the better the model effect and the stronger the generalization ability. In the medical field, the labeling of data usually needs professionals with medical knowledge, and the definition of entity types is different in different application scenarios. For example, when extracting disease-related information, the entity types may be mostly "symptoms", "examinations" and "tests", while when extracting drug-related information, the entity types may be mostly "ingredients", "indications" and "doses". Therefore, the task of medical entity recognition in different scenarios requires data annotation according to different annotation specifications. It can be seen that the labeling of medical text is a costly and difficult task, and the existence of data augmentation technology is to solve this problem.

Data augmentation is a technology to artificially expand the scale of training data set by making limited data produce more equivalent data. With data augmentation technology, a large number of data with labeled information can be obtained quickly and at low cost by designing an appropriate algorithm framework and using models to automatically label data. By means of data augmentation, a lot of labor costs are saved, and at the same time, the effects of increasing the scale of training data, improving the generalization ability of the model, increasing noise data and improving the robustness of the model are realized. Therefore, how to effectively enhance the data of medical NER task is a job that can greatly reduce the cost and improve the effect of medical information extraction.

The existing technologies of data augmentation mainly include two types: one is to randomly replace the same type of entities to enhance the data, and the other is to enhance the data through the generation of language models.

Randomly replacing entities of the same type is a common data augmentation method in the NER task in the general field. The method is very simple and easy to implement, that is, replacing the named entities marked in the existing training data with the same type of entity words can generate new samples marked with entities. For example, if the original data contains the sample "My home is in Hangzhou", in which Hangzhou is marked as a named entity of "city" type, then another named entity "Shanghai" with the type of "city" is taken to replace it, and a new sample "My home is in Shanghai" can be obtained. In this way, the training data is enhanced to get more pseudo-labeled data. Its disadvantage is that it needs additional data resources, such as entity dictionary, etc. The effect of data augmentation is related to the quality and scale of entity dictionary. At the same time, the richness of data augmentation by this method is insufficient, and the sentence pattern of the enhanced data is relatively simple, which may affect the overall distribution of the corpus and bring additional noise.

The method of enhancing by language model generation is to mix the original sequence annotation label with the token, for example, the original content is "I live in Hangzhou", where "Hangzhou" is a "LOC" type entity, and it will become the form of "I live in S_LOC Hangzhou" after being shuffled with the label. The existing labeled data is adjusted in the above form, and a LSTM model is used to train the language model of the adjusted data. Based on the language model obtained by training, "[BOS]+ random token" is input, and the subsequent text content can be automatically generated by the language model. Because the training data of the language model is shuffled with sequence annotation labels, the generated text will also have sequence annotation labels, and the generated data can be physically labelled according to the labels, and the enhanced labelled data can be obtained. However, the methods of language model generation are mostly based on single words or sub-word sequences for text prediction, while medical entities are mostly composed of fixed semantic units. When the general method is directly applied to the medical field, the unique semantic characteristics of medical entities will be ignored, resulting in the generated data may not conform to the characteristics of medical terms or violate medical logic, thus affecting the accuracy of NER model.

Common generation models mostly use left-to-right decoding method, which can only use the historical information that has been generated, but cannot use the future information that has not yet been generated, resulting in a certain degree of paranoia in the generated samples; at the same time, with the generation sequence becoming longer, the problem of error accumulation is easily aggravated by the single-direction generation method: for example, if unreasonable words are generated somewhere in the middle, the subsequent prediction results will be biased, which will affect the quality of the overall generated samples.

Generally, the training process of generating model only uses strong label data for training, but the performance of generating model is limited due to the very limited amount of strong label data, and the quality of generating model will directly affect the quality of enhanced data, thus determining the effectiveness of data augmentation methods.

SUMMARY

The object of the present disclosure is to provide a method and an apparatus of NER-oriented Chinese clinical text data augmentation aiming at the shortcomings of the prior art. A text generation method is adopted for data augmentation, so that the dependence of the same type entity replacement method on additional resources is avoided, and the data augmentation effect is effectively improved. According to the present disclosure, medical entities are semantically segmented, for example "chronic kidney calculi" is segmented into "chronic kidney calculi", and on this basis, a span-based language model is trained and a text is generated. Since the model training process keeps the independent semantic units in the medical entity, the model can better learn the semantic information contained in the real data, and then reflect it in the results of text generation, so that the enhanced annotation data can be more in line with the medical terminology specifications and achieve the purpose of high-quality data augmentation.

In addition to the conventional left-to-right decoding mode, reverse and two-direction decoding mechanisms are added in the present disclosure, the historical and future information is effectively modeled, the sentence structure of the enhanced data is enriched, the diversity of the generated results is increased, and the quality of the generated results is improved, so that the enhanced data generated by the model can better serve the subsequent NER task learning.

At the same time, in the training stage of the generated model, the weak label data is used to supplement the training data, and the noise influence of the weak label data is avoided by adjusting the loss function, so that the generated model can be trained on a larger scale of labeled data, thereby improving the model performance.

The object of the present disclosure is achieved through the following technical solution: in a first aspect, the present disclosure provides a method of NER-orientated Chinese clinical text data augmentation; the method includes the following steps:
  (1) data preprocessing: acquiring clinical text data without annotation information and performing word segmentation to obtain processed unannotated data; and acquiring clinical text data with annotation information for entity segmentation, annotation segmented entities to obtain processed annotation data, and performing label linearization processing;
  (2) pre-training of a span-based language model: predicting a concealed part based on retained information by using the unannotated data and concealing part of information in the text; and meanwhile introducing an entity word-level discrimination task, randomly replacing entities contained in a sentence with similar entities in an entity library, and using a discriminator network for entity word level detection to determine whether each word in the entities is a word of original entities;
  (3) introducing a plurality of decoding mechanisms in a fine-tune stage: obtaining, in the fine-tune stage, a relationship between a text vector and the text data based on the pre-trained span-based language model, converting linearized data with entity labels into the text vector for training of a text generation model, inputting the text data that needs to be enhanced into the trained text generation model, performing text generation through forward decoding and reverse decoding in a prediction stage of the text generation model to obtain a generation result with the entity labels, and analyzing the labels to obtain enhanced data with the annotation information.

Further, in step (1), the data preprocessing process comprises word segmentation of the unannotated data and label linearization operation on annotated data; the unannotated data is used for semantic model learning of a pre-training stage; based on an existing medical dictionary, a mode of combining the dictionary and a rule is adopted to perform word segmentation on the unannotated data; and the annotated data is annotated by adopting a BIES annotation mode, and used for generation model training in the fine-tune stage.

Further, in step (1), a specific process of label linearization processing is: segmenting non-entity parts in the clinical text data into single words, mixing labels corresponding to annotated entity spans with segmented sentence spans, treating the labels as an independent segmentation span and placing in front of the corresponding text content.

Further, a specific process of entity replacement step (2) is as follows:
  1) Defining fine-grained phrase composition structures of different types of medical entities by combining a medical dictionary and medical knowledge.
  Each fine-grained composition structure is an independent phrase with independent semantics that cannot be further split.
  2) Further segmenting entities to be replaced into independent semantic units according to predefined fine-grained information.
  3) Retrieving similar words of a same type for each independent semantic unit after segmentation, obtaining first top-k similar words of the same type arranged in an order from high degree to low degree of similarity with to-be-replaced words by calculating a semantic similarity degree, and randomly selecting one to replace an original content.
  4) Operating step 1) to step 3) on each independent semantic unit to finally complete a whole entity replacement process.

Further, a specific process of the entity word-level discrimination task in step (2) is: assuming that a sentence sequence X inputted into the span-based language model contains n entities $S^{(1)}, S^{(2)}, \ldots, S^{(n)}$, for an $i^{th}$ entity $S^{(i)}$, retaining the entity with a probability P, and selecting an entity with similar semantics from the entity library with a probability 1-P, namely:

$$\hat{S}^{(i)} = \begin{cases} S^{(i)}, & p < P \\ \mathcal{F}(S^{(i)}, \mathcal{R}), & \text{else} \end{cases}$$

where $\mathcal{R}$ represents the entity library, $\mathcal{F}$ is an entity selection strategy function, $\hat{S}^{(i)}$ represents a selected entity with the semantics similar to the entity $S^{(i)}$, and p is random variate uniformly distributed following U(0,1).

Forming a new sentence X through the above entity random replacement; coding $\hat{X}$ by a depth self-attention network Transformer to obtain a corresponding representation sequence H, and recording a coding result of the entity $S^{(i)}$ as $H^{(i)} = (h_m, \ldots, h_n)$, where m and n represent starting and ending positions of the entity $\hat{S}^{(i)}$ in a sentence sequence respectively, and h is a semantic vector representation at the corresponding position; and then inputting $H^{(t)}$ into the discriminator network for word-level entity detection.

A structure of the discriminator network is two linear layers plus a ReLU activation function, and using a mode of Layer Normalization and residual connection to ensure the stability of network training:

$$h_i' = \text{LayerNorm}(h_i + \text{RELU}(W_1 h_i))$$

$$\hat{h}_t = \text{LayerNorm}(h_i' + \text{RELU}(W_2 h_i'))$$

where $W_1$ and $W_2$ are weights of a first linear layer and a second linear layer respectively, $h_i'$ is an output result of a first layer of the network, and $\hat{h}_t$ is an output result of a second layer of the network.

Finally inputting $\hat{h}_t$ into a Sigmoid function for binary classification: if a word at a position i in X is consistent with a word at a position i in $\tilde{X}$, a prediction target being 1, otherwise the prediction target being 0.

Further, in step (3), in the decoding process of the forward decoding and the reverse decoding, a two-direction multi-head attention model is constructed to realize utilization of existing coding information of another process.

For the forward decoding, i.e., text generation from left to right, the following probability calculation is performed:

$$p(Y|X) = P(y_1|X)P(y_2|X,y_1)P(y_3|X,y_1,y_2) \ldots P(y_n|X,y_1,y_2,\ldots,y_{n-1})$$

For the reverse decoding, i.e., text generation from right to left, the following probability calculation is performed:

$$p(Y|X) = P(y_n|X)P(y_{n-1}|X,y_n)P(y_{n-2}|X,y_n,y_{n-1}) \ldots P(y_1|X,y_n,y_{n-1},\ldots,y_2)$$

where n is a position of a decoding result, and $y_n$ is a decoding result of a corresponding position.

A segmented token is firstly subjected to embedding, then is decoded through a long-short term memory model (LSTM) structure, and then is subjected to linear transformation to obtain an output result; two-direction decoding performs text generation from two ends to a middle at the same time by maintaining decoders in two directions; the forward decoding is recorded as an L2R module, the reverse decoding is recorded as an R2L module, and in the two-direction decoding process, the L2R module takes a historical prediction result in the direction and the existing coding information of the R2L module as inputs for prediction; the R2L module takes the previous prediction result and the existing coding information of the L2R module as inputs for prediction. A specific process is: assuming that the L2R module currently is to predict a $n^{th}$ token, the corresponding R2L module is to predict an $n^{th}$ to last token, after several layers of coding, an obtained vector sequence of the L2R module is $H^{(l2r)}$ $[h_1^{(l2r)} \; h_2^{(l2r)} \; \ldots, \; h_n^{(l2r)}]$ where $h_n^{(l2r)}$ represents a coding result at an $n^{th}$ position of a sentence obtained by the L2R module, and a vector sequence of the corresponding R2L module is $H^{(r2l)} = [h_1^{(r2l)}, h_2^{(r2l)}, \ldots, h_n^{(r2l)}]$ where $h_n^{(r2l)}$ represents a coding result at an $n^{th}$ position of a sentence obtained by the R2L module; under the two-direction decoding mechanism, $h_n^{(l2r)}$ is taken as a query vector, $H^{(r2l)}$ is taken as a key and a value for an attention operation, an output of an attention mechanism is taken as a feature to predict the $n^{th}$ token, similarly, $h_n^{(r2l)}$ is taken as a query vector, $H^{(l2r)}$ is taken as a key and a value for the attention operation, an output is taken as a feature to predict the $n^{th}$ token, and a final loss function is a mean value of a cross entropy of two directions; in the prediction stage of two-direction decoding, top-k results of the two directions are cached at the same time; when a next token is predicted, in addition to enumerating the top-k tokens with the highest probability and top-k temporary paths in the current direction, top-k reverse temporary paths are further enumerated, the temporary paths are text sequences for storing temporarily generated results in the text generation process, a probability value of each path is calculated as a score of the corresponding path, after calculating the scores of all combinations, the top-k highest scores are retained, and the reverse is the same; and finally, after the two directions are both decoded, the one with the highest score is selected as the output result.

Further, in step (3), a training process of a combination of strong and weak labels is as follows: adopting, by a training process of the text generation model, a mode of combining the strong and weak labels; firstly, performing confidence estimation on entity labels in weak label data generated by the text generation module, the confidence level indicating a trust degree of a current label, and the confidence estimation being as follows:

$$w = \begin{cases} 1, & Y = Y^h \\ \dfrac{\sum \log P(y_i)}{|Y|}, & \text{else} \end{cases}$$

where Y represents a sequence $(y_1, y_2, \ldots, y_t, \ldots, y_n)$, $Y^h$ represents a manually annotated strong label sequence, the confidence of the strong label sequence is set to be 1 due to a high confidence level for manual annotation.

For the adjustment of the loss function of the training stage of the text generation model, performing weighted calculation based on negative logarithmic likelihood, and affecting the degree of learning of the model by the confidence level, the loss function being as follows:

$$\text{Loss}(Y) = w \cdot \Sigma - \log P(y_i)$$

where w is a confidence estimate.

Further, existing strong label data is firstly used for initialization of the text generation model, part of weak label data is generated based on the model, then the generated weak label data is used for mixing the initial strong label data, fine-tune of the generation model is performed, and the weak label data is supplemented; and the training process of step (3) is repeated, so that the model performs iterative self-learning until the average confidence of the model on a pre-separated verification set meets a preset threshold.

In a second aspect, the present disclosure provides an apparatus of NER-orientated Chinese clinical text data augmentation; the apparatus includes a memory and one or more processors, the memory storing executable codes, and when executing the executable codes, the processor implements the method for NER-orientated Chinese clinical text data augmentation.

In a third aspect, the present disclosure provides a computer readable storage medium, storing a program thereon, and when executed by a processor, the program implements the method of NER-orientated Chinese clinical text data augmentation.

The present disclosure has the following beneficial effects.

(1) The present disclosure adopts a span-based language model, which better preserves the information of medical semantic units. By adopting the span-based language model, the characteristics of medical entity words are learned, and word-level discriminant auxiliary tasks are introduced to complement masked language model tasks, so that the model pays more attention to word-level differences of entities and improves the difficulty of auxiliary tasks. Further explore the potential of the model, and encourage the model to store the independent semantic units of each dimension contained in the medical entity into the vector representation, so as to obtain better results in the fine-tune stage.

(2) Using the in-domain pre-trained language model to generate the text, making full use of the large-scale in-domain unannotated data, fully learning the characteristics of the medical text, and fine-tuning based on the obtained LM, so as to obtain a generation model that can generate the text with entity labels, so as to avoid the problem of model performance degradation caused by insufficient scale of labeled data when training the generation model only using labeled data, which will affect the data quality and even affect the performance of the final NER task.

(3) The present disclosure realizes the supplement of training data by mixing the weak label data generated by the model with the manually marked strong label data, and at the same time adopts the loss function suitable for the shuffled training of strong and weak labels, so that the model can learn data with different confidence levels more intelligently. Since there is noise in weak label data and the amount of weak label data is much larger than that of super label data, the model may be over-fitted to the noise of weak label data, thus affecting the performance of the model. Therefore, the confidence of the entity labels in the data is firstly calculated to evaluate the credibility of the labels in the data. At the same time, the loss function of the model is adjusted. When the label confidence in the data is high, the loss function is more radical and the model fits more, while when the label confidence is low, the model fits more conservatively.

(4) The present disclosure introduces various decoding forms in the decoding stage, including forward decoding, reverse decoding and two-direction decoding. Compared with the conventional generation model that only uses forward decoding, because the model can only use historical information, the generated enhanced data will have some similarity in structure. When the enhanced data is used as the main training data for NER task learning, the knowledge source of the model may be limited, thus affecting the final recognition effect. By introducing various decoding forms, the present disclosure enables the generated data to have various sentence structures, greatly enriches the diversity of the enhanced data, and enables the enhanced data to contain more comprehensive knowledge information, thereby obtaining a more robust NER model. At the same time, only one-way decoding is used, which may lead to the problem of unbalanced output, which leads to the low confidence of some enhanced data and can not be used. Therefore, the present disclosure introduces a two-direction decoding mode at the same time, which avoids the problem of unbalanced output, and improves the quality of enhanced data while further improving the diversity of data, thus ensuring that the model can generate more high-quality enhanced data.

DESCRIPTION OF EMBODIMENTS

The specific embodiment of that present disclosure will be further described in detail with reference to the accompanying drawing.

Figure 1:
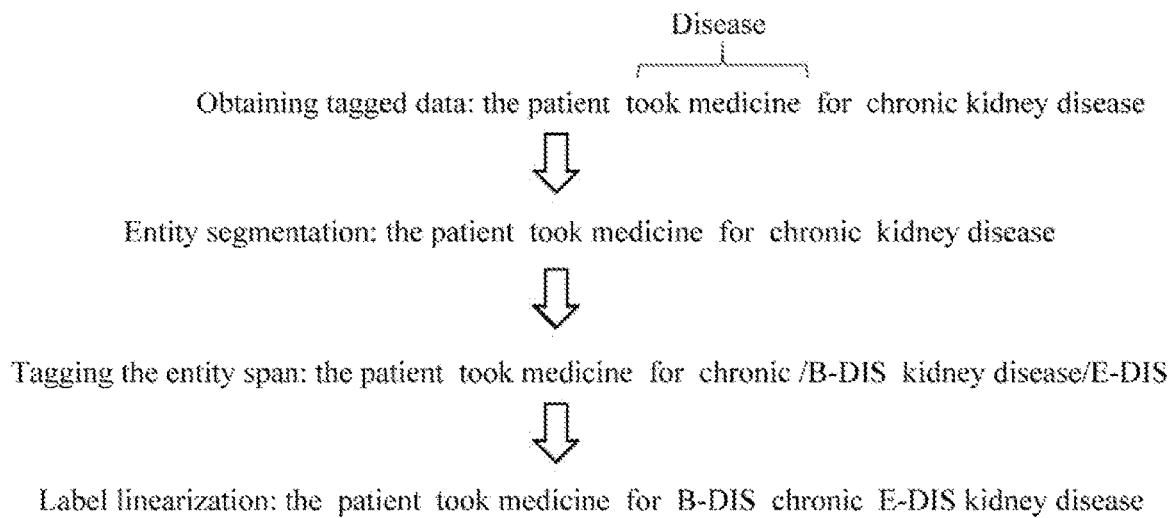
FIG. 1 is a schematic diagram of a processing flow of annotated data.

As shown in FIG. 1, the main flow and detailed description of a method of NER-oriented Chinese clinical text data augmentation according to the present disclosure are as follows:

1. Data preprocessing:

The data preprocessing process mainly includes word segmentation of unannotated data and label linearization operation of annotated data.

For unannotated data, it is mainly used for language model learning in the pre-training stage. Based on the existing medical dictionaries, the unannotated data is segmented by combining dictionaries with rules.

For the annotated data, it is mainly used for the training and optimization of the generation model in the fine-tune stage. The main processing flow is as follows:

Entity segmentation:

Based on the existing medical dictionaries and combined with the knowledge of medical experts, the independent semantic units are segmented according to the word-formation characteristics of different types of medical entities. For example, disease entity words may include degree words, position words, disease description words and other parts, and operation entity words may include position words, surgical description words and other parts. Based on the combination of dictionary and rules, the content of various types of entities is further segmented, such as "chronic kidney disease" and "gallbladder cholecystectomy".

In the process of further entity segmentation, combined with the knowledge guidance of medical experts, and taking full account of the unique language characteristics of medical entities, the semantic units within the entities are divided, so as to ensure that the entity semantics are not destroyed and provide more initial data information for the subsequent network training process.

Annotation of entity spans:

The segmented entity spans are annotated by BIES annotation mode. Among them, the BIES annotation means that the initial segment of the entity part is marked with "B-Tag", the middle segment of the entity part is marked with "I-Tag", the end segment of the entity part is marked with "E-Tag", and the entity composed of a single segment is marked with "S-Tag". For example, "biliary tract malignant tumor" is divided into "biliary tract malignant tumor". If the type label is DIS (representing disease), then it can be labeled as "biliary tract/B-DIS malignant/I-DIS tumor/E-DIS", and "tumor" can be labeled as "tumor/S-DIS" if it cannot be further segmented.

Label linearization:

The non-entity part of the data is segmented by words, and the label corresponding to the marked entity segment is shuffled with the segmented sentence segment, and the label is regarded as an independent segmented segment and placed in front of the corresponding text content, for example "tumor/S-DIS" is adjusted to "S-DIS tumor". After label linearization, the original labeled data becomes a labeled sentence, for example "the patient took medicine for B-DIS chronic E-DIS kidney disease".

2. Span-based pre-training of language model

The language model is pre-trained by using unannotated data in large-scale domain, and the language model is trained by concealing some information in the text and predicting the concealed part based on other reserved information.

The operation of concealing some information in the text is called mask, that is, each token in the selected span is replaced with a [MASK] identifier. For a sequence of $X=(x_1, x_2, \ldots, x_n)$, a subset Y is selected for masking. Spans are continuously selected until the number of tokens in the corresponding proportion is met. In the process of selecting a span, it tends to select a span with a shorter length, and the starting position of a random phrase is semi-randomly selected as the beginning of the span, and a phrase with complete semantics is selected as a complete span to mask without exceeding the specified length.

At the same time, in order to finely distinguish the semantic differences of different entity spans, in addition to the masked language model (masked LM) task mentioned above, an additional entity word-level discrimination task is introduced. The task is described as follows: the entity contained in the sentence is randomly replaced with similar entities in the entity library, and the word level of the entity is detected by using the discriminator network to judge whether each word in the entity is the word of the original entity.

Figure 2:
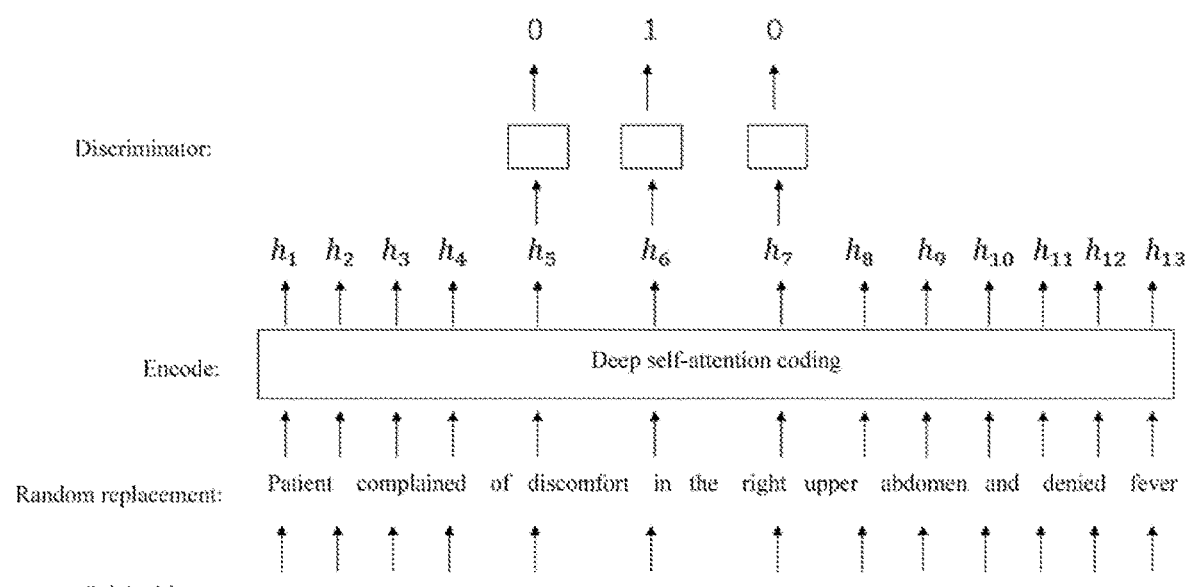
FIG. 2 is a schematic diagram of entity word-level discrimination task.

The task flow of entity word-level discrimination can refer to FIG. 2:

The detailed implementation method is as follows: assuming that the input sentence sequence X contains k entities $S^{(1)}, S^{(2)}, S^{(n)}$. For each entity $S^{(i)}$, the entity is retained with a probability of P (for example, P=50%), and entities with similar semantics are selected from the entity library with a probability of 1-P, namely:

$$\hat{S}^{(i)} = \begin{cases} S^{(i)}, & p < P \\ \mathcal{F}(S^{(i)}, \mathcal{R}), & \text{else} \end{cases}$$

where $\mathcal{R}$ is the entity library, and $\mathcal{F}$ is the strategic function of entity selection.

After the above entities are randomly replaced, a new sentence $\hat{X}$ is formed. $\hat{X}$ is used as input and coded by a deep self-attention network (Transformer) to obtain the corresponding representation sequence H. The coding result of $\hat{S}^{(i)}$ of each entity is recorded as $H^{(i)}=(h_m, \ldots, h_n)$, where m and n respectively represent the starting and ending positions of the entity in the sentence sequence, and H is the semantic vector representation of the corresponding position. Then, $H^{(i)}$ is input into the discriminator network for word-level entity detection. The discriminator network structure consists of two linear layers plus ReLU activation function, and the stability of the network training is ensured by Layer Normalization and residual connection:

$$h_i' = \text{LayerNorm}(h_i + \text{RELU}(W_1 h_i))$$

$$\hat{h}_t = \text{LayerNorm}(h_i' + \text{RELU}(W_2 h_i'))$$

Finally, $\hat{h}_t$ is input into a Sigmoid function for binary classification: if the word at position i in $\hat{X}$ is consistent with the word at position i in X, the prediction target is 1, otherwise it is 0.

The entity replacement strategy is described as follows:

As mentioned above, medical entities are mostly composed of many fine-grained phrases. For example, disease entity words may include position words, degree words, disease description words, etc., and operation entity words may include position words, surgical description words and other parts. Therefore, in the process of entity replacement, each independent semantic unit in the entity is replaced by the same kind, such as the position word is replaced by the position word and the degree word is replaced by the degree word, so as to construct the replaced entity which is similar to the original entity. The specific process is as follows:

1. By combining medical dictionaries and medical knowledge, a fine-grained phrase composition structure of different types of medical entities is defined, for example an operation entity=a position word+an operation descriptor, and a disease entity=a degree word+a position word+a disease descriptor.

2. The entity to be replaced is further segmented according to predefined fine-grained information, for example "chronic nephropathy", "gall bladder resection" and "left lower abdominal pain".

3. Similar words of the same type are searched for each segmented independent semantic unit, and the top-k similar words of the same type which are most similar to the to-be-replaced words are obtained by calculating the semantic similarity, and one of them is randomly selected to replace the original content.

4. The above operations is performed on each independent semantic unit, and the whole entity replacement process is finally completed.

The training goal of masked language model (masked LM), the main task of language model, is to predict the whole entity according to the context, while the auxiliary task of word-level discriminator is introduced to pay more attention to the finer word-level differences within the entity, so it is introduced to complement the masked LM task to make the model training more sufficient.

At the same time, by substituting similar words for semantic units of different dimensions in the entity, similar entities are constructed, which improves the difficulty of auxiliary tasks, thus further discovering the potential of the model and making the model more sensitive to entity information.

3. Various decoding mechanisms are introduced in the fine-tune stage.

In the fine-tune stage, based on the pre-trained in-domain language model, the text generation model is trained on the linearized training data with entity labels, so as to obtain the generation results with entity labels, and the enhanced data with annotation information is obtained by parsing the labels.

At the same time, in addition to the commonly used forward decoding, reverse and two-direction decoding mechanisms are introduced.

Forward decoding, that is, text generation from left to right, is to perform the following probability calculation:

$$p(Y|X) = p(y_1|X)p(y_2|X, y_1)p(y_3|X, y_1, y_2)$$

Similarly, reverse decoding, that is, text generation from right to left, is to perform the following probability calculation:

$$p(Y|X) = P(y_n|X)p(y_{n-1}|X, y_n)p(y_{n-2}|X, y_n, y_{n-1})$$

Figure 3:
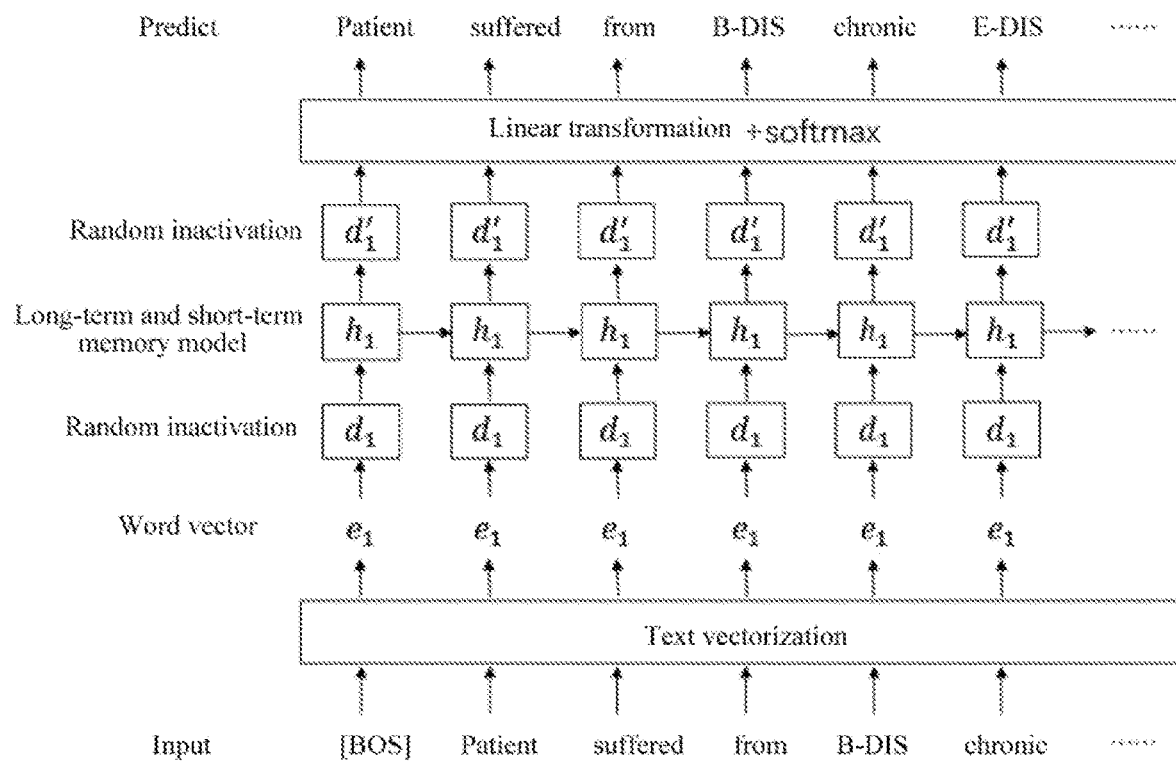
FIG. 3 is a structural diagram of a one-way text generation model.

The above two one-way decoding models all use the basic LSTM network architecture for lightweight training. Referring to FIG. 3, the segmented token is subjected to embedding first, then to the LSTM structure, and the output result is obtained through linear transformation. Among them, "[BOS]" stands for "beginning of sentence" and "[EOS]" stands for "end of sentence" and serves as the marker of sentence end. In the prediction stage, a conventional beam search algorithm is used for calculation.

Two-direction decoding can generate text from both ends to the middle by maintaining decoders in two directions. The forward decoding is called as a L2R module, and backward decoding as a R2L module. In the two-direction decoding process, first, starting marks are input to both modules, then the L2R module is responsible for predicting the first token, while R2L is responsible for predicting the last token, and then the first token and the existing coding information of the R2L module are transmitted to the L2R module to predict the second word. Similarly, the last token and the existing coding information of the L2R module are transmitted to the R2L module to predict the penultimate token, and so on until the ending mark appears.

Figure 4:
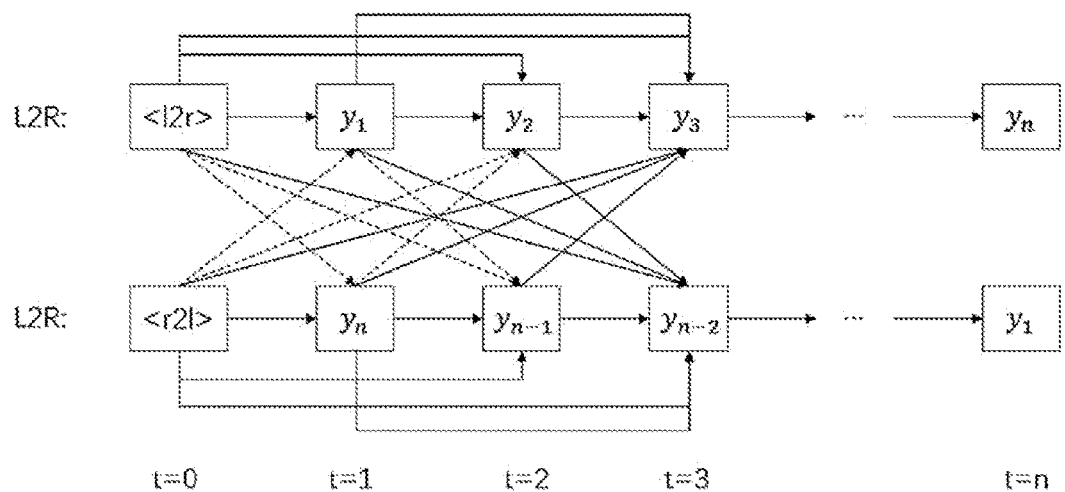
FIG. 4 is a schematic structural diagram of the two-direction text generation model.

In the process of two-direction decoding, the existing coding information of another module is utilized by constructing a two-direction multi-head attention model (refer to FIG. 4). Suppose that the L2R module is currently predicting the $n^{th}$ token and the corresponding R2L module is predicting the $n'$ to last token, after several layers of coding, an obtained vector sequence of the L2R module is $H^{(l2r)}=[h_1^{(l2r)}, h_2^{(l2r)}, \ldots, h_n^{(l2r)}]$ and a vector sequence of the corresponding R2L module is $H_{(r2l)}=[h_1^{(r2l)}, h_2^{(r2l)}, \ldots, h_n^{(r2l)}]$; under the two-direction decoding mechanism, $h_n^{(l2r)}$ is taken as a query vector, $H^{(r2l)}$ is taken as a key and a value for an attention operation, an output of an attention mechanism is taken as a feature to predict the $n^{th}$ token to achieve the perception for the future information; similarly, $h_n^{(l2r)}$ is taken as a query vector, $H^{(r2l)}$ is taken as a key and a value for the attention operation, an output is taken as a feature to predict the $n^{th}$ token to achieve the perception for the history information; a final loss function is a mean value of a cross entropy of two directions; in the prediction stage, the idea of beam search is still adopted, but the top-k results in two directions are cached at the same time; when a next token is predicted, in addition to enumerating the top-k tokens with the highest probability and top-k temporary paths in the current direction, top-k reverse temporary paths are further enumerated; after calculating the scores of all combinations, the top-k highest scores are reserved; finally, after decoding in both directions is completed, the one with the highest score is selected as the output result.

4. Training process of combining strong and weak labels

The training process of generating model adopts the combination of strong and weak labels.

Firstly, the confidence of the entity labels in the weak label data is estimated, and the magnitude of the confidence indicates the degree of trust in the current label. This confidence estimation will be used to calculate the loss function and judge whether the training process stops iteration. The confidence estimation is as follows:

$$w = \begin{cases} 1, & Y = Y^h \\ \frac{\sum \log P(y_i)}{|Y|}, & \text{else} \end{cases}$$

where Y represents a sequence $(y_1, y_2, \ldots, y_l, \ldots, y_n)$, and $Y^h$ represents a manually annotated strong label sequence, and the strong label sequence has high reliability with manual annotation, so its confidence is set to 1.

The main purpose of adjusting the loss function in the training stage is to make the model fit more labels with high confidence, while the fitting of labels with low confidence is relatively conservative. Therefore, a weighted calculation is made on the basis of negative logarithmic likelihood, and the learning degree of the model is influenced by the confidence. The loss function is as follows:

$$\text{Loss}(Y) = w \cdot \Sigma - \log P(y_i)$$

where w is the confidence estimate.

5. Multi-Stage Iterative Self-Learning

Figure 5:
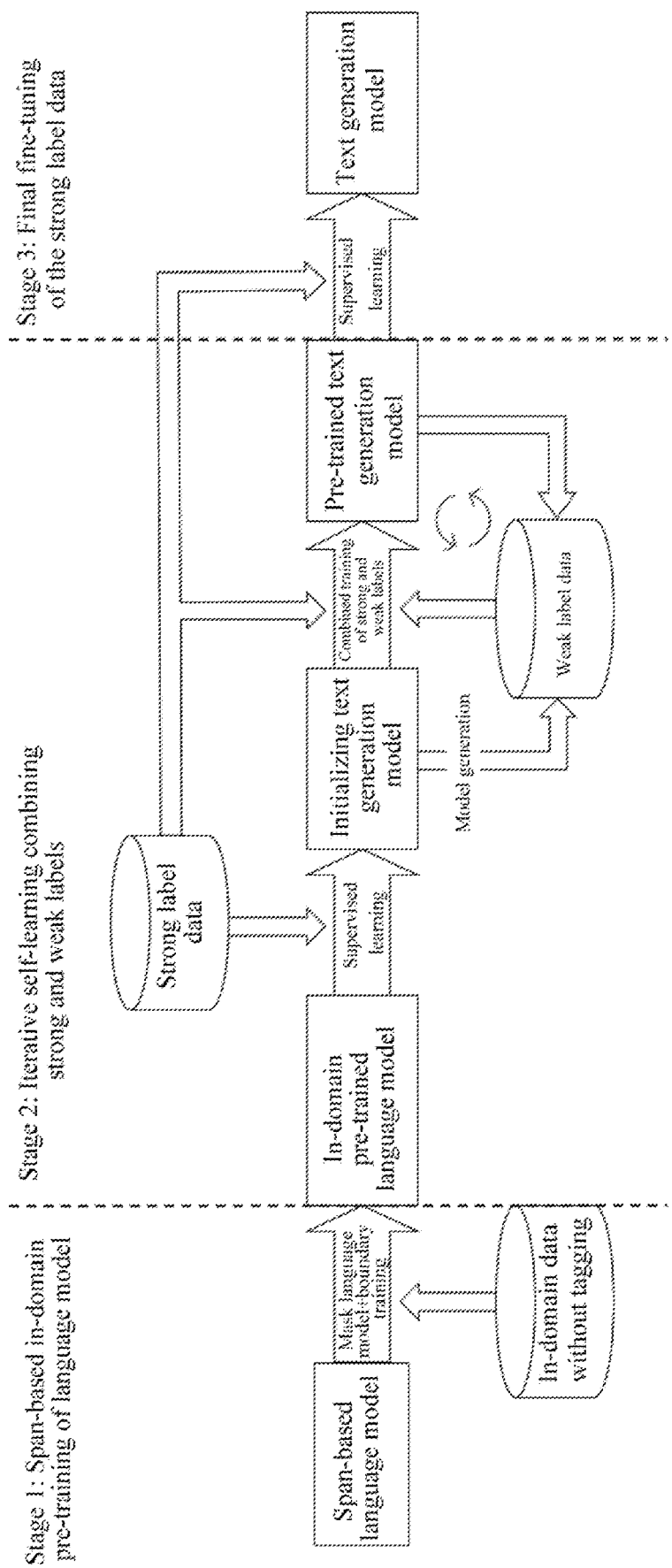
FIG. 5 is a schematic diagram of the multi-stage iterative self-learning process.

The complete model training is divided into three main stages (refer to FIG. 5):

In the first stage, unannotated data is used to pre-train the span-based LM, and the method of mask language model (MLM)+ entity word-level discrimination task is used to change the model from an open-domain language model to an in-domain language model.

In the second stage, the existing small amount of strong label data is used to initialize the text generation model (that is, the forward, reverse and two-direction generation model mentioned above), and a part of weak label data is generated based on this model. Then, the generated weak label data is shuffled with the initial strong label data to fine-tune the generation model and supplement the weak label data.

The training process in the second stage is repeated, so that the model can carry out iterative self-learning until the average confidence of the model on the pre-separated check set meets the preset threshold.

In the third stage, the strong label data is used to fine-tune the generated model.

Through the multi-stage iterative self-learning combined with the above strong and weak labels, the diversity of data is enriched and enhanced, and the performance of the generated model is improved.

Specific application examples:

In the first stage, the language model is pre-trained by means of mask language model+entity word-level discrimination task. For example, "the left eye is gradually blurred for one year" will be replaced by "the abdomen is gradually [MASK] for one year" in the entity word-level discrimination task, and the model needs to predict the text content at the position of [MASK] and distinguish whether "abdomen" is the content of the original text.

In the second stage, the text generation model is initialized on the strong label data, and part of weak label data is generated. For example, the first word of the sentence "left eye" is given, then the text generation model can automatically generate enhanced data such as "left eye B-SYM vision I-SYM unclear E-SYM", "left eye B-SYM vision I-SYM blurred E-SYM for several years"and" left eye B-SYM has pain and discomfort E-SYM for half a day", where SYM is a symptom entity label, and this part of enhanced data will be used as weak label data for iterative training of the text generation model.

In the third stage, only the strong label data is used to fine-tune the generated model, and the above-mentioned enhanced data such as "left eye B-SYM vision I-SYM unclear E-SYM", "left eye B-SYM vision I-SYM blurred E-SYM for several years" and "left eye B-SYM has pain and discomfort E-SYM for half a day" will not participate in the model training at this stage.

After the above process, the final text generation model is obtained and used to generate enhanced data. For example "epigastrium", the generation model can automatically generate enhanced data with entity labels, such as "epigastrium B-SYM pain I-SYM unbearable E-SYM for half a day", "epigastrium B-SYM discomfort E-SYM for days" and "epigastrium B-SYM occupation E-SYM for half a year", which can be used in the model training process of Chinese clinical text NER task.

After several rounds of iteration and confidence screening, the generated model can ensure a high quality of enhanced data. By using the generated enhanced data, the training data scale of Chinese clinical text NER task can be greatly expanded, so that the NER model can be trained better and the entities in Chinese clinical text can be recognized more accurately.

Corresponding to the aforementioned embodiment of the method of NER-oriented Chinese clinical text data augmentation, the present disclosure also provides an embodiment of the apparatus of NER-oriented Chinese clinical text data augmentation.

Figure 6:
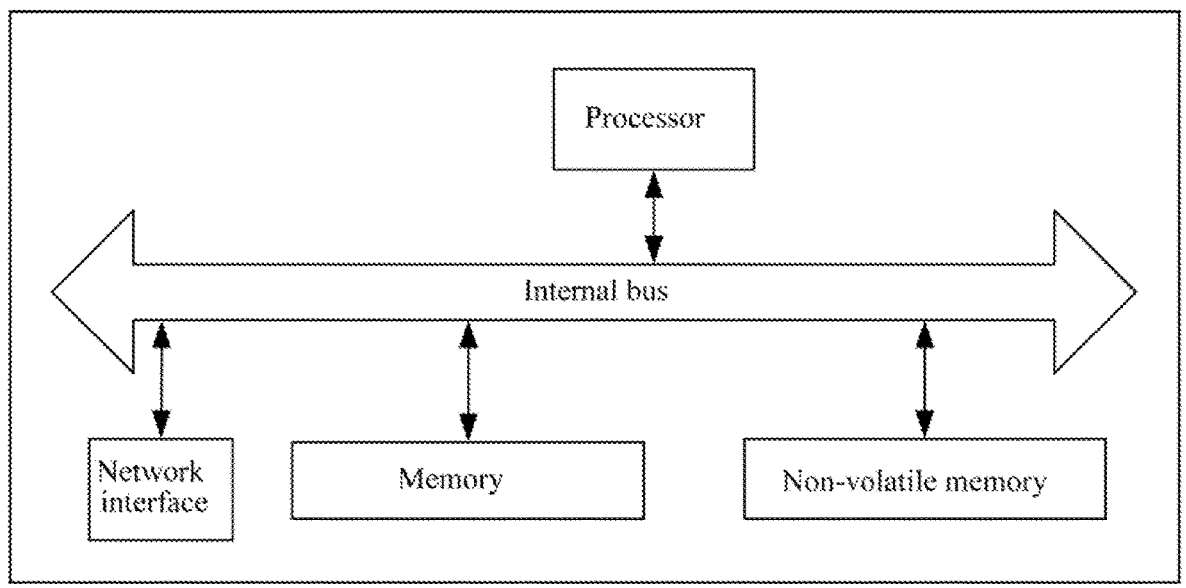
FIG. 6 is a structural diagram of an apparatus NER-oriented Chinese clinical text data augmentation according to the present disclosure.

Referring to FIG. 6, an apparatus of NER-oriented Chinese clinical text data augmentation according to an embodiment of the present disclosure includes a memory and one or more processors; executable codes are stored in the memory, and when the executable codes are executed, the processors are used to implement the method of NER-oriented Chinese clinical text data augmentation in the above embodiment.

The embodiment of the apparatus of NER-oriented Chinese clinical text data augmentation according to the present disclosure can be applied to any apparatus with data processing capability, which can be device or equipment such as computers. The embodiment of the apparatus can be implemented by software, or by hardware or a combination of hardware and software. Taking software implementation as an example, as a logical apparatus, it is formed by reading the corresponding computer program instructions in the non-volatile memory into the memory through the processor of any equipment with data processing capability. From the hardware level, as shown in FIG. 6, it is a hardware structure diagram of any apparatus with data processing capability where the apparatus of NER-oriented Chinese clinical text data augmentation according to the present disclosure is located. Besides the processor, memory, network interface and nonvolatile memory shown in FIG. 6, any apparatus with data processing capability in the embodiment usually includes other hardware according to the actual function of the apparatus with data processing capability, which will not be described here again.

The implementation process of the functions and actions of each unit in the above-mentioned apparatus is detailed in the implementation process of the corresponding steps in the above-mentioned method, and will not be repeated here.

For the apparatus embodiment, since it basically corresponds to the method embodiment, it is only necessary to refer to part of the description of the method embodiment for the relevant content. The apparatus embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. Ordinary technicians in this field can understand and implement it without creative labor.

The embodiment of the present disclosure also provides a computer-readable storage medium, on which a program is stored, which, when executed by a processor, implements the method of NER-oriented Chinese clinical text data augmentation in the above embodiment.

The computer-readable storage medium can be an internal storage unit of any apparatus with data processing capability as described in any of the previous embodiments, such as a hard disk or a memory. The computer-readable storage medium can also be an external storage apparatus of any apparatus with data processing capability, such as a plug-in hard disk, Smart Media Card (SMC), SD card, Flash Card and the like provided on the apparatus. Further, the computer-readable storage medium can also include both internal storage units and external storage devices of any apparatus with data processing capability. The computer-readable storage medium is used for storing the computer program and other programs and data required by any equipment with data processing capability, and can also be used for temporarily storing data that has been output or will be output.

The above-mentioned embodiments are used to explain, rather than to limit the present disclosure. Any modification and change made to the present disclosure within the scope of protection of the spirit and claims of the present disclosure shall fall within the scope of protection of the present disclosure.

What is claimed is:

1. A method of Named Entity Recognition (NER)-oriented Chinese clinical text data augmentation, comprising:
    data preprocessing, comprising: acquiring clinical text data without annotation information and performing word segmentation to obtain processed unannotated data; and acquiring clinical text data with annotation information for entity segmentation, annotation segmented entities to obtain processed annotation data, and performing label linearization processing;
    pre-training of a span-based language model, comprising: predicting, by using unannotated data and concealing a part of information in text, the concealed part based on retained information, and introducing an entity word-level discrimination task, randomly replacing entities contained in a sentence with similar entities in an entity library, and detecting an entity word level using a discriminator network to determine whether each word in the entities is a word of original entities,
    wherein said replacing entities further comprises:
    defining fine-grained phrase composition structures of different types of medical entities by combining a medical dictionary and medical knowledge, wherein each fine-grained composition structure is an independent phrase with indivisible independent semantics;
    segmenting entities to be replaced into independent semantic units according to predefined fine-grained information;
    retrieving similar words of a same type for each independent semantic unit after segmentation, obtaining first top-k similar words of the same type arranged in an order from high degree to low degree of similarity with to-be-replaced words by calculating a semantic similarity degree, and randomly selecting one to replace an original content; and
    operating on each independent semantic unit to finally complete a whole entity replacement process;
    wherein the entity word-level discrimination task further comprises:
    assuming that a sentence sequence X inputted into the span-based language model contains n entities $S^{(1)}$, $S^{(2)}, \ldots, S^{(n)}$, and for an $i^r$ entity $S^{(t)}$, retaining the entity with a probability P and selecting an entity with similar semantics from the entity library with a probability 1-P, namely:

$$\hat{S}^{(i)} = \begin{cases} S^{(i)}, & p < P \\ \mathcal{F}(S^{(i)}, \mathcal{R}), & \text{else} \end{cases}$$

where $\mathcal{R}$ represents the entity library, $\mathcal{F}$ represents an entity selection strategy function, $\hat{S}^{(i)}$ represents a selected entity with the semantics similar to the entity $S^{(i)}$, and p represents random variate uniformly distributed following U(0,1);

forming a new sentence g through the entity random replacement; coding X by a depth self-attention network Transformer to obtain a corresponding representation sequence H, and recording a coding result of the entity $\vec{S}^{(i)}$ as $H^{(i)} = (h_m, \ldots, h_n)$, where m and n represent starting and ending positions of the entity $\hat{S}^{(i)}$ in a sentence sequence, respectively, and h represents a semantic vector representation at the corresponding position; and then inputting $H^{(i)}$ into the discriminator network for word-level entity detection, wherein a structure of the discriminator network is two linear layers plus a ReLU activation function, and Layer Normalization and residual connection is applied to ensure stability of network training:

$h_i' = \text{LayerNorm}(h_i + \text{RELU}(W_1 h_i))$ $\hat{h}_t = \text{LayerNorm}(h_i' + \text{RELU}(W_2 h_i'))$ where $W_1$ and $W_2$ represents weights of a first linear layer and a second linear layer, respectively, $h_i'$ represents an output result of a first layer of the network, and $\hat{h}_t$ represents an output result of a second layer of the network; and inputting $\hat{h}_t$ into a Sigmoid function for binary classification: when a word at a position i in X is consistent with a word at a position i in X, a prediction target being 1, and otherwise, the prediction target being 0; and introducing a plurality of decoding mechanisms in a fine-tune stage: obtaining, in the fine-tune stage, a relationship between a text vector and the text data based on the pre-trained span-based language model, converting linearized data with entity labels into the text vector for training of a text generation model, inputting the text data that needs to be enhanced into the trained text generation model, performing text generation through forward decoding and reverse decoding in a prediction stage of the text generation model to obtain a generation result with the entity labels, and analyzing the labels to obtain enhanced data with the annotation information;

wherein decoding process of the forward decoding and the reverse decoding comprises: constructing a two-direction multi-head attention model to realize utilization of existing coding information of another process;

wherein in the forward decoding, that is, text generation from left to right, the following probability calculation is performed:

$P(Y|X) = P(y_1|X)P(y_2|X,y_1)P(y_3|X,y_1,y_2) \ldots P(y_n|X,y_1, y_2, \ldots, y_{n-1})$ wherein in the reverse decoding, that is, text generation from right to left, the following probability calculation is performed:

$P(Y|X) = P(y_n|X)P(y_{n-1}|X,y_n)P(y_{n-2}|X,y_n,y_{n-1}) \ldots P(y_1|X,y_n,y_{n-1}, \ldots, y_2)$ where n represents a position of a decoding result, and I represents a decoding result of a corresponding position;

wherein a segmented token is subjected to embedding, is decoded through a long-short term memory model (LSTM) structure, and is subjected to linear transformation to obtain an output result;

wherein two-direction decoding comprises text generation from two ends to a middle synchronously by maintaining decoders in two directions, wherein the forward decoding is recorded as an L2R module, the reverse decoding is recorded as an R2L module, the L2R module takes a historical prediction result in a forward direction and existing coding information of the R2L module as inputs for prediction, the R2L module takes a previous prediction result and existing coding information of the L2R module as inputs for prediction;

wherein during the two-direction decoding: assuming that the L2R module currently is to predict an $n^t$ token, the R2L module is to predict an $n^{th}$ to last token, after several layers of coding, an vector sequence $H^{(l2r)} = [h_1^{(l2r)}, h_2^{(l2r)}, \ldots, h_n^{(l2r)}]$ of the L2R module is obtained, where $h_n^{(l2r)}$ represents a coding result at an $n^{th}$ position of a sentence obtained by the L2R module, and a vector sequence of the corresponding R2L module is $H^{(r2l)} = [h_1^{(r2l)}, h_2^{(r2l)}, \ldots, h_n^{(r2l)}]$ where $h_n^{(r2l)}$ represents a coding result at an $n^{th}$ position of a sentence obtained by the R2L module; wherein under mechanism of the two-direction decoding, $h_n^{(l2r)}$ is taken as a query vector, $H^{(r2l)}$ is taken as a key and a value for an attention operation, an output of an attention mechanism is taken as a feature to predict the $n^{th}$ token, $h_n^{(r2l)}$ is taken as a query vector, $H^{(l2r)}$ is taken as a key and a value for the attention operation, an output is taken as a feature to predict the $n^{th}$ token, and a final loss function is a mean of a cross entropy of the two directions;

wherein during prediction stage of the two-direction decoding, top-k results of the two directions are cached synchronously; when a next token is predicted, top-k tokens with the highest probability, top-k temporary paths in the forward direction, and top-k reverse temporary paths are both enumerated, the temporary paths are text sequences for storing temporarily generated results during the text generation, a probability value of each path is calculated as a score of the each path, after calculating scores of all combinations, top-k highest scores are retained, and in a same way top-k highest scores of paths in the reverse direction are retained; and after decoding in the two directions are both finished, a decoding in a direction with a highest score is selected as the output result;

wherein a training process of a combination of strong and weak labels comprises: adopting, by a training process of the text generation model, a mode of combining the strong and weak labels; performing confidence estimation on entity labels in weak label data generated by the text generation module, a confidence level indicating a trust degree of a current label, and the confidence estimation being as follows:

$$w = \begin{cases} 1, & Y = Y^h \\ \dfrac{\sum \log P(y_i)}{|Y|}, & \text{else} \end{cases}$$

where Y represents a sequence $(y_1, y_2, \ldots, y_l, \ldots, y_n)$, $Y^h$ represents a manually annotated strong label sequence, a confidence of the strong label sequence is set to be 1; and wherein the loss function of the training stage of the text generation model is adjusted by performing weighted calculation based on negative logarithmic likelihood, and affecting the degree of learning of the model by the confidence level, and wherein the loss function being as follows:

$$\mathrm{Loss}(Y) = w \cdot \Sigma - \log P(y_i)$$

where w represents a confidence estimate.

2. The method of NER-orientated Chinese clinical text data augmentation according to claim 1, wherein in said data preprocessing comprises: word segmentation of the unannotated data and label linearization operation on annotated data; wherein the unannotated data is configured for semantic model learning of a pre-training stage, and word segmentation on the unannotated data by combining the dictionary and a rule based on an existing medical dictionary, and the annotated data is annotated using a BIES annotation mode, and is configured for generation model training in the fine-tune stage.

3. The method of NER-orientated Chinese clinical text data augmentation according to claim 1, wherein in, said label linearization processing comprises:

segmenting non-entity parts in the clinical text data into single words, mixing labels corresponding to annotated entity spans with segmented sentence spans, treating the labels as an independent segmentation span and placing in front of text content corresponding to the segmentation span.

4. The method of NER-orientated Chinese clinical text data augmentation according to claim 1, wherein in, the text generation model is initialized using initial strong label data, part of weak label data is generated based on the initialized text generation model, the initial strong label data is mixed using the generated weak label data, the text generation model is fine-tuned, and the weak label data is supplemented; and the training process of is repeated, such that the text generation model performs iterative self-learning until an average confidence of the text generation model on a pre-separated verification set satisfies a preset threshold.

5. An apparatus of NER-orientated Chinese clinical text data augmentation, comprising:

a memory storing executable codes; and one or more processors, wherein the processor, when executing the executable codes, implements the method of NER-orientated Chinese clinical text data augmentation method according to claim 1.

6. A computer readable storage medium, storing a program, wherein the program, when executed by a processor, implements the method of NER-orientated Chinese clinical text data augmentation according to claim 1.

* * * * *